P. B. JOHNSON.
GREASE GUN.
APPLICATION FILED APR. 3, 1920.

1,372,292. Patented Mar. 22, 1921.

Inventor
Peter B. Johnson.
Attorney
Frank Warren

UNITED STATES PATENT OFFICE.

PETER B. JOHNSON, OF SEATTLE, WASHINGTON.

GREASE-GUN.

1,372,292.          Specification of Letters Patent.    Patented Mar. 22, 1921.

Application filed April 3, 1920. Serial No. 371,154.

*To all whom it may concern:*

Be it known that I, PETER B. JOHNSON, a citizen of the United States, residing at Seattle, in the county of King and State of Washington, have invented a certain new and useful Improvement in Grease-Guns, of which the following is a specification.

My invention relates to improvements in grease guns of the type that are adapted to handle heavy lubricating oils and grease and the object of my improvement is to provide a grease gun that may be connected with a source of supply of grease under pressure and that may be caused to discharge a measured quantity of grease at each cycle of operation.

Another object is to provide a grease gun in which a measured quantity of grease is discharged or crowded out by the pressure of the next succeeding charge as it enters the gun, the gun being arranged to discharge and fill simultaneously.

A further object is to provide a grease gun of this nature having a cylindrical receptacle in which the grease is measured, the said receptacle being provided with a floating piston and being arranged so that after the cylinder has filled the charge may be expelled from one end of the cylinder by the pressure of the next succeeding charge as it enters the opposite end of the cylinder.

A still further object is to provide a suitable arrangement of by-passes and three-way valves controlling the same so that the grease may enter at or be discharged from either end of the cylinder or grease receptacle but will always be delivered through the same nozzle to the parts to be lubricated.

Still further objects are to provide a grease gun that is simple and cheap in construction, reliable and efficient in operation, and one that is relatively light in weight and convenient to handle and that may be readily used for delivering grease into the transmission gear, and differential gear housings of motor vehicles.

The invention consists in the novel construction, adaptation and combination of parts of a grease gun as will be more clearly hereinafter described and claimed.

Figure 1:
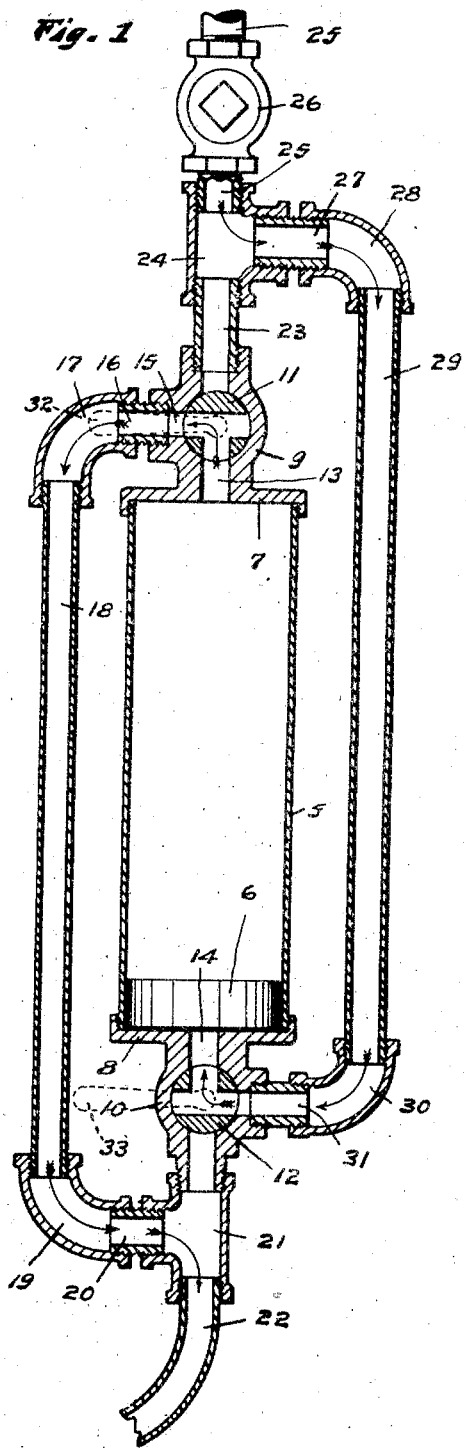
Figure 2:
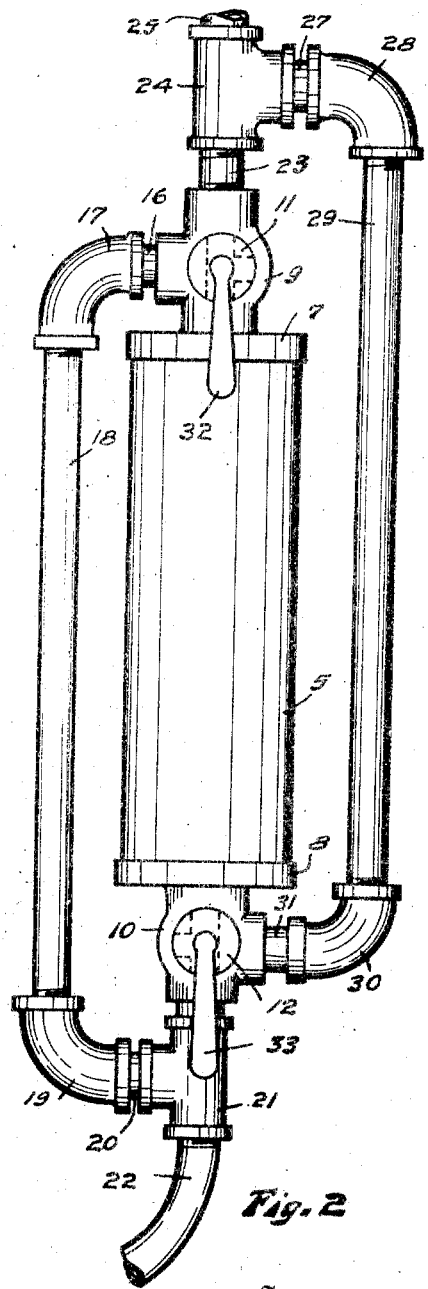

In the accompanying drawings Figure 1 is a view in longitudinal mid-section of a grease gun constructed in accordance with my invention and Fig. 2 is a view in elevation of the same showing the three-way valves in a different position.

Like reference numerals designate like parts throughout the several views.

Referring to the drawings the numeral 5 designates a cylindrical receptacle having a freely movable piston 6 disposed therein. The volume of the receptacle 5 minus the volume of the piston 6 is the effective volume that may be filled with grease and may be any desired known quantity.

The receptacle 5 is provided at its opposite ends with caps or end members 7 and 8 that terminate in valve casings 9 and 10 respectively that are transversely bored for the reception of valve plugs 11 and 12 which are suitably recessed to form three-way valves. The valve casings 9 and 10 are provided with axial passageways 13 and 14 respectively that communicate with the interior of the receptacle 5 and that intersect the transverse bores in which the valve plugs 11 and 12 are disposed.

The upper valve casing 9 is provided with a transverse passageway 15 that communicates through a pipe 16 and elbow fitting 17 with a longer pipe 18 which in turn is connected by an elbow fitting 19 and pipe 20 with a T fitting 21 that is connected at one end with the lower valve casing 10 and at the other end with a discharge pipe or nozzle 22 that may be of any desired length and curved in any desired manner to facilitate its insertion into gear housings and various like inaccessible places.

The upper end of the valve casing 9 is connected by a pipe 23 and T fitting 24 with a grease inlet pipe 25 wherein is interposed a shut off valve 26.

The T fitting 24 is also connected by a short pipe 27 and elbow fitting 28 with the upper end of a longer pipe 29 the bottom end of which is connected by an elbow fitting 30 and short pipe 31 with one side of the lower valve casing 10.

The valve plugs 11 and 12 are provided with handles 32 and 33 respectively by which they may be turned.

In operation the pipe 25 is connected preferably by a flexible hose, not shown, with a source of supply of grease under pressure. If the gun is empty the grease will be forced into such gun and the receptacle 5 will be filled as soon as the valve 26 is opened, the piston 6 being crowded to one end of the receptacle 5 and the air escaping through the outlet pipe 22.

In Fig. 1 the piston 6 is at the bottom end of the receptacle 5, the receptacle is filled with grease above the piston and it is assumed that the valves 11 and 12 have just been turned into the position shown. Under the above conditions grease under pressure entering through the pipe 25 will flow downwardly through the pipe 29 past the valve 12 and upwardly through the passageway 14 into the receptacle 5 thus crowding the piston 6 toward the opposite end of the receptacle and forcing out a measured charge of grease through the passageway 13, valve 11, pipe 18 and discharge nozzle 22.

When in use the several pipes and passageways will all become filled with grease and remain full thus insuring the discharge of an amount equal to the effective cubical contents of the receptacle 5 each time the piston moves from one end to the other of the receptacle.

When the piston reaches the upper end of the receptacle 5 it will close the passageway 13 and shut off further discharge of grease. If the valves 11 and 12 are then turned from the position shown in Fig. 1 to the position shown by dotted lines in Fig. 2 the pipes 18 and 29 which form by-passes will both be shut off and grease will enter the upper end of the receptacle through the passageway 13 and as it forces the piston 6 downwardly will force a measured charge of grease outwardly through the passageway 14, valve 12 and discharge pipe 22.

By the preceding description it will be seen that after the gun is once filled with grease it is always ready for use and will discharge a measured quantity each time the valves 11 and 12 are turned from one operative position to the other thereby enabling the user to quickly and easily introduce any desired amount of grease into any desired place as into the transmission gear housing or the differential gear housing of a motor vehicle.

While this device is described as being particularly well adapted for handling heavy lubricating oil and grease it will be understood that the same may be used for handling other viscous substances.

From the foregoing description taken in connection with the accompanying drawings the advantages of the construction and of the method of operation of my grease gun will be readily apparent, but, while I have described the principle of operation of the invention together with the device which I now consider to be the best embodiment thereof it will be understood that the structure shown is merely illustrative and that such changes may be made as are within the scope of the following claim.

What I claim is:—

A grease gun comprising a receptacle, a piston freely movable within said receptacle, a conduit connected with each end of said receptacle, a discharge nozzle connected with one of said conduits, means for admitting grease under pressure to the other conduit, a three-way valve interposed in each of said conduits, a by pass conduit connected with the lowermost three-way valve and with the uppermost conduit at a point above the uppermost threeway valve and another by pass conduit connected with the uppermost threeway valve and with the lowermost conduit at a point below the lowermost three-way valve.

In witness whereof, I hereunto subscribe my name this 27th day of March, A. D. 1920.

PETER B. JOHNSON.